Patented May 1, 1923.

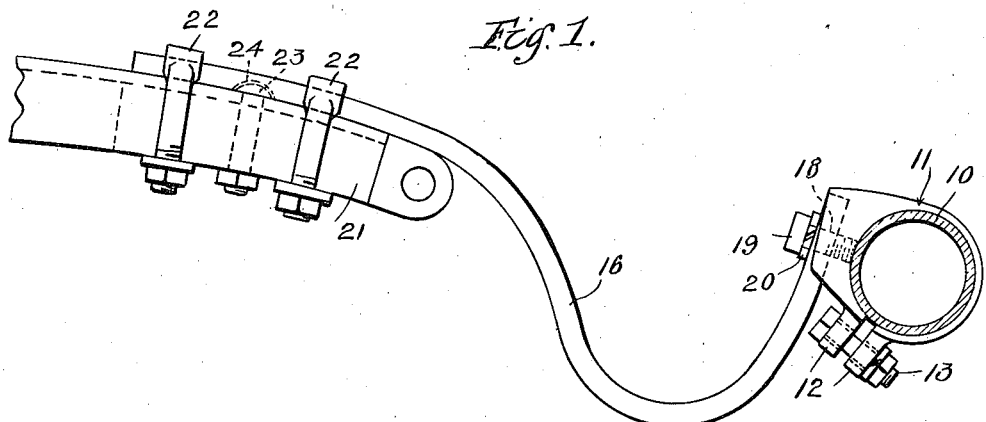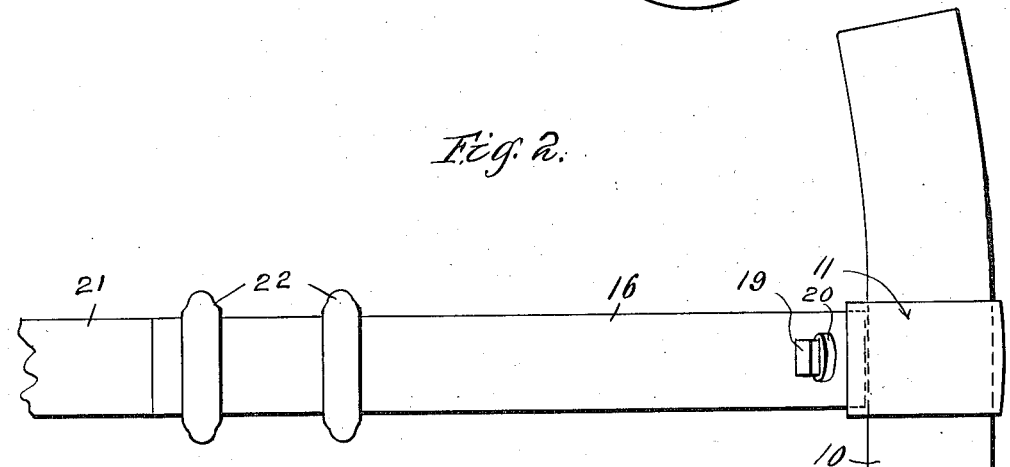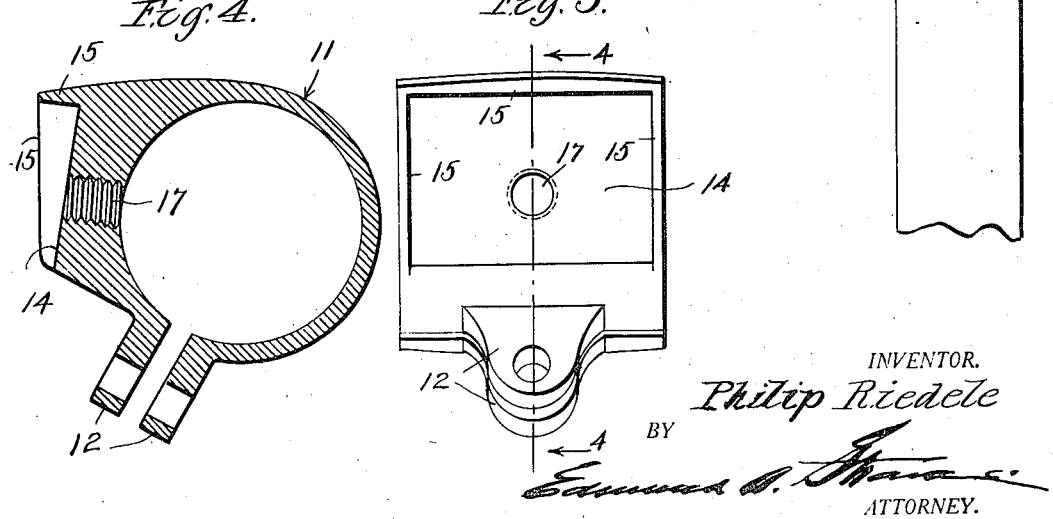

1,453,521

UNITED STATES PATENT OFFICE.

PHILIP RIEDELE, OF LOS ANGELES, CALIFORNIA.

BUMPER-BAR-SUPPORTING BRACKET.

Application filed October 18, 1922. Serial No. 595,249.

*To all whom it may concern:*

Be it known that I, PHILIP RIEDELE, a citizen of the United States, residing at Los Angeles, in the county of Los Angeles and State of California, having invented new and useful Improvements in Bumper-Bar-Supporting Brackets, of which the following is a specification.

My invention relates to bumper bar supporting brackets adapted for supporting bumper bars in position on automobiles.

The object of my invention is to provide a device for the above recited purpose which will be simple, durable and efficient and which may be readily and easily applied and secured in accurate position in order that all of the members will be held firmly together when subjected to excessive strains resulting from shocks and collision of the bumper with obstacles or when the vehicle is being drawn over rough roads.

Other objects of my invention will be more fully disclosed in the following specification, reference being had to the accompanying drawing, in which:

Fig. 1 is a side view of one of the side rails of the chassis of an automobile showing my invention applied thereto.

Fig. 2 is a plan view of the same.

Fig. 3 is an enlarged face view of the bumper bar clamping member.

Fig. 4 is a section through the same taken on the line 4—4 of Fig. 3, viewed in the direction indicated by the arrows.

In carrying out my invention, 10 represents a bumper bar preferably formed of a metallic cylindrical tube adapted to be positioned transversely of the vehicle in the usual manner. 11 represents a clamping member, adapted to be secured to the bumper bar 10, and in practice two of these members are employed, one for each end of the bumper bar, it being understood in the drawings, only one end of the bumper bar is shown, the attachments at the other end being identical.

The clamping member 11 comprises a split collar adapted to surround the bar 10, which is provided with the ears 12 having bores formed therein for the reception of a clamping bolt 13. By this construction it will be obvious that the collar may be slipped over the bar and clamped firmly thereto in the desired adjusted position, by means of the bolt 13.

The clamping member 11 is also provided with a suitable seat 14 on its periphery which is surrounded on three of its sides by ribs 15, thus forming a socket for the reception of one end of the spring bracket supporting arm 16. The arm 16 is formed of spring strap metal and is of such width as to permit of its edges to fit snugly between two of the ribs 15, and its end to abut against the other rib, as clearly shown in the several views of the drawings.

The member 11 is provided with a threaded bore 17 which extends from the surface of seat 14 to the internal surface of the collar, and the outer end of the bracket member 16 is provided with an aperture or bore 18 which registers with the threaded bore 17. By this construction it will be observed that the member 11 may be secured to the arm 16 by means of the set screw 19 and these members will be held from shifting with respect to each other by means of the ribs 15.

The end of the set screw 19 is designed to set against the surface of bar 10 and the head thereof is designed to abut against the spring bracket arm 16, and in order that this may be conveniently accomplished without necessitating accurate proportioning of the parts, a spring washer 20 is interposed between the head of the set screw 19 and the surface of the bracket arm 16, as clearly shown in Fig. 1 of the drawings.

The opposite end of the spring bracket arm 16 may be secured to the side rail 21 of the vehicle chassis in any suitable manner, as for instance by means of the clevis members 22, and in order that the bracket may be permitted to lie closely to the upper surface of the side rail, which usually has projected therefrom the heads of securing bolts, such as is shown at 23, the under surface of the bracket is provided with indents 24 for the reception of these bolt heads.

By the above recited construction it will be observed that I have provided a dual means for s' uring the bumper bar to the clamping member 11 and also a very effective means for securing the clamping member to the resilient shock absorbing arm, thus guarding against the danger of these members becoming jarred loose and separated one from another

What I claim is:

In a device of the class described, the combination with a cylindrical bumper bar, of a split clamping collar for engaging and supporting said bumper bar, a bolt for securing the ends of said collar together to clamp the bumper bar, said collar being provided on its periphery with a flanged seat, a spring supporting arm having an aperture in one of its ends adapted to engage the seat, said collar being provided on its seat portion with a threaded bore, and a threaded bolt for securing the spring supporting arm to said collar, the end of said bolt engaging the bumper bar to prevent a turning movement In witness that I claim the foregoing I have hereunto subscribed my name this 22nd day of September, 1922.

PHILIP RIEDELE.